United States Patent
Kato et al.

[11] Patent Number: 5,314,036
[45] Date of Patent: May 24, 1994

[54] STEERING ANGLE SENSOR

[75] Inventors: Shinji Kato, Aichi; Soya Takagi, Toyota; Akio Sato, Toyota; Mizuho Sugiyama, Toyota; Yuji Yokoya, Toyota, all of Japan

[73] Assignee: Toyota Jidosha Kabushiki Kaisha, Toyota, Japan

[21] Appl. No.: 816,726

[22] Filed: Jan. 3, 1992

[30] Foreign Application Priority Data

Jan. 21, 1991 [JP] Japan ................... 3-5191

[51] Int. Cl.⁵ .............. B62D 3/12; B62D 5/04; G01D 5/12; G01R 33/06
[52] U.S. Cl. ................. 180/147; 180/148; 180/79.1; 116/31; 116/204
[58] Field of Search ........... 180/79.1, 147, 148; 116/31, 204

[56] References Cited

U.S. PATENT DOCUMENTS

| | | | |
|---|---|---|---|
| 4,445,923 | 5/1984 | Shetterly | 116/204 X |
| 4,550,597 | 11/1985 | Drutchas et al. | 180/79.1 X |
| 4,853,672 | 8/1989 | Yasuda et al. | 180/79.1 X |
| 4,924,696 | 7/1990 | Schroeder et al. | 180/148 X |
| 4,944,356 | 7/1990 | Oslapas | 180/79.1 |
| 5,083,626 | 1/1992 | Abe et al. | 180/79.1 |
| 5,135,067 | 8/1992 | Kohata et al. | 180/79.1 |

FOREIGN PATENT DOCUMENTS

| | | | |
|---|---|---|---|
| 2642836 | 8/1990 | France | 180/79.1 |
| 62-12457 | 1/1987 | Japan | 180/79.1 |
| 1257202 | 10/1989 | Japan | 116/204 |

Primary Examiner—Margaret A. Focarino
Assistant Examiner—Peter C. English
Attorney, Agent, or Firm—Oblon, Spivak, McClelland, Maier & Neustadt

[57] ABSTRACT

A steering angle sensor for accurately detecting the steering angle of a vehicle, which has a signal pattern based on partial changes of the electromagnetic characteristics formed at part of the steering rack bar of the steering gear box and reads the same by a signal detector provided opposing the steering rack bar so as to detect the absolute position of the steering rack bar.

8 Claims, 2 Drawing Sheets

STEERING ANGLE SENSOR

BACKGROUND OF THE INVENTION

1. Field of the Invention

The present invention relates to a steering angle sensor in a vehicle for accurately sensing the steering angle of wheels being subjected to a steering operation.

2. Description of the Related Art

As a steering angle detection apparatus used in conventional vehicles, the main one consists of a steering sensor, comprised of a type of optical encoder, built into the steering column. This detects on a relative basis the rotational angle of the steering wheel. It has a structure sandwiching in a slit disk having a large number of holes on its periphery and mounted to the steering shaft and is mounted on the steering column, forming a pair with the sensor body, a photointerrupter. When the steering shaft is turned by the driving of the driver, the slit disk repeatedly blocks and transmits light, so the photointerrupter generates an electrical pulse signal, so by counting the number of the same, the relative rotational angle of the steering shaft is detected and based on that the steering direction is calculated.

The conventional steering angle detection apparatus using a steering sensor provided in the steering column calculates the absolute steering angle of the wheels based on the relative rotational angle of the steering shaft. Right after the power is turned on etc., however, the steering angle of the wheels is unknown and further the rotation of the steering wheel is transmitted to the wheels through a steering shaft, intermediate shaft, steering pinion gear, the universal joints connecting the same, and the steering rack bar etc., so there is a chance of some degree of error occurring between the steering angle calculated from the rotational angle of the steering shaft which the steering sensor detects and the steering angle which actually appears due to elastic deformation of the parts, assembly error, looseness of the joints, gear backlash, etc. With this apparatus, it is not possible to directly sense the steering angle of the wheels, so it was difficult to raise the precision of detection.

SUMMARY OF THE INVENTION

The present invention has as its object the provision of a steering angle sensor of a simple construction which deals with the problems in the above-mentioned prior art and which can directly and accurately sense the absolute steering angle extremely close to the actual steering angle of a vehicle.

The present invention, to achieve this object, provides a steering angle sensor in a vehicle which has a signal pattern based on partial changes of the electromagnetic characteristics formed at part of the steering rack bar of the steering gear box and reads the same by a signal detector so as to detect the absolute position of the steering rack bar.

The changes in the steering angle of the wheels subjected to a steering operation in the vehicle correspond substantially completely to the displacement of the steering rack bar of the steering gear box respectively connected to the shaft of the steered wheels through a simple link mechanism, so if the displacement of the steering rack bar in a direction of measurement along the length of the bar is accurately detected, the steering angle can be accurately judged.

The present invention has a signal pattern showing the position in the form of changes in electromagnetic characteristics formed at the surface of the steering rack bar and reads the value of the electromagnetic characteristics of the signal pattern at the portion which a signal detector currently faces so as to detect the absolute position of the steering rack bar and thereby enable accurate sensing of the steering angle of the wheels subjected to a steering operation.

DESCRIPTION OF THE PREFERRED EMBODIMENTS

Figure 1:
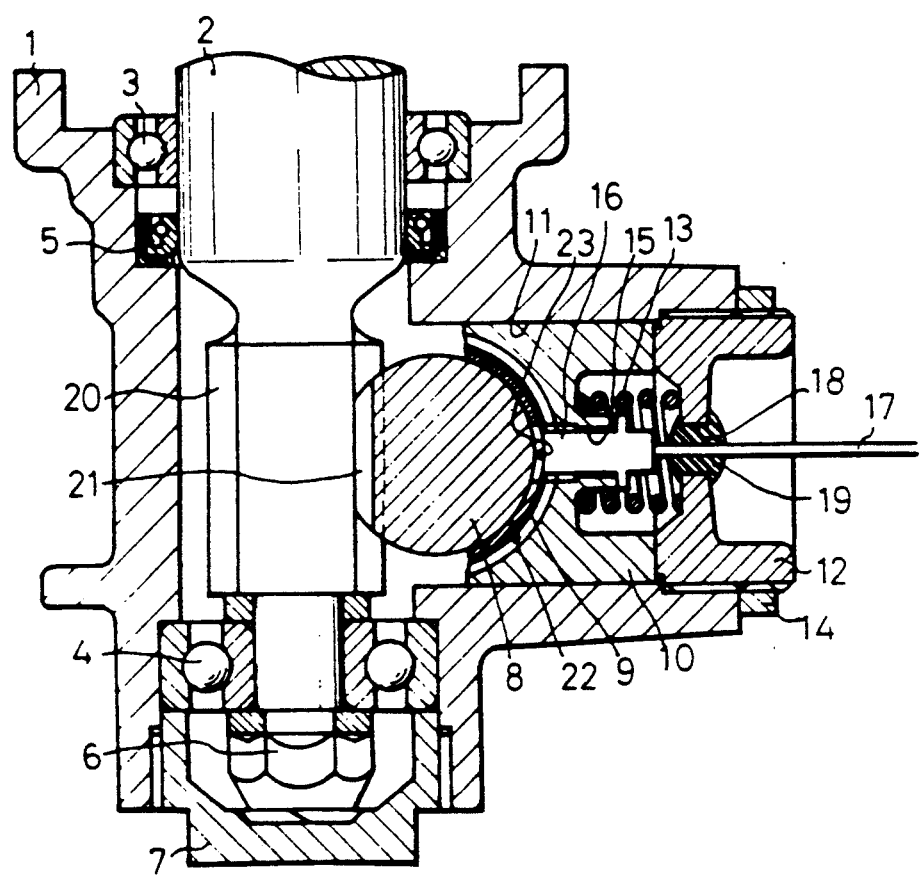
FIG. 1 is a longitudinal sectional view of a steering gear box including a steering angle sensor of an embodiment of the present invention.

The figures show an embodiment of the steering angle sensor of the present invention. FIG. 1 shows a longitudinal section of the overall steering gear box in which the steering angle sensor is mounted. In FIG. 1, 1 is a housing of the steering gear box and 2 is a steering pinion gear axially supported in the same by bearings 3 and 4. While not shown, this is made to be turned by a steering wheel operated by a driver through a steering shaft passing through a steering column, universal joints, intermediate shaft, and sometimes a power steering apparatus and many other mechanisms and members. Reference numeral 5 is an oil seal, 6 is a nut attached to the inner race of the bearing 4, and 7 is a cap blocking the opening of the housing 1 and fixing the outer race of the bearing 4.

Reference numeral 8 is a steering rack bar which engages with a steering pinion gear 2. While not shown, the two ends are respectively connected through a knuckle arm or other simple link mechanism to the shafts of the steered wheels. The steering rack bar 8 is slidingly supported at the back through a seat 9 by a steering rack guide 10. The steering rack guide 10 is slidingly inserted in an opening 11 provided in the housing 1. A screw plug 12 screwed in so as to close the opening 11 and a compression spring 13 which this supports bias this in the direction of the steering rack bar 8. Note that 14 shows a lock nut for the screw plug 12. Further, a lubricant is sealed in the housing 1. The above-mentioned construction may be said to be substantially the same as that of the conventional steering gear box.

Corresponding to the features of the present invention, in the steering gear box of the illustrated embodiment, a screw hole 15 is provided at the center of the steering rack guide 10 inserted in the opening 11. In this is inserted and screwed in from the outside a later mentioned signal detector 16. The front end of the signal detector 16 faces the toothless back surface of the steering rack bar 8 at a suitable clearance. A lead wire 17 attached to the rear end is led to the outside through the hole 18 of the screw plug 12. Reference numeral 19 shows a sealing member closing the hole 18.

Figure 2:
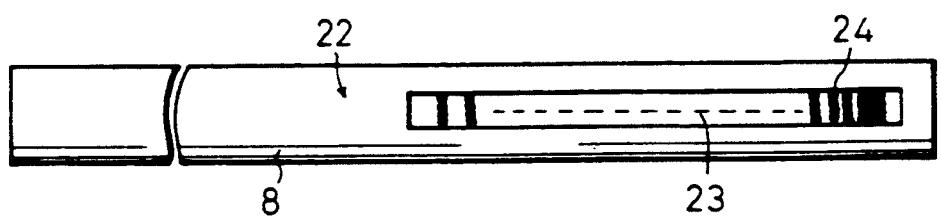
FIG. 2 is a side sectional view showing main parts of a steering angle sensor of an embodiment of the present invention.
Figure 3:
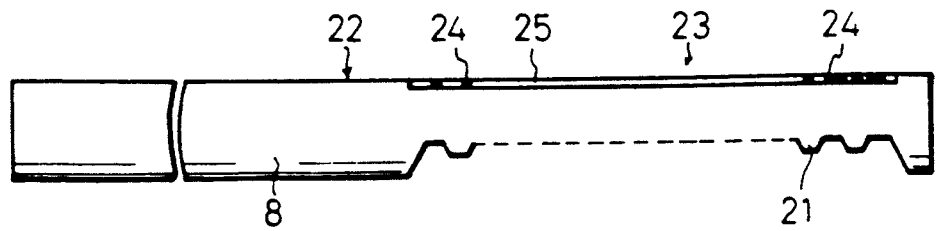
FIG. 3 is a plane view showing main parts of a steering angle sensor of an embodiment of the present invention.

Details of the steering rack bar 8 are shown in FIG. 2 and FIG. 3. The back surface 22, of the steering rack bar 8 engaging with the teeth 20 of the steering pinion gear 2 is a smooth, cylindrical surface (may also be flat surface) and is not provided with any teeth. A sheet 25 made of a different material and having a special signal pattern 23 formed corresponding to the signal detector 16 is fixed at part of the surface by a method such as welding, fusion, or press-fitting. The sheet 25 is made, for example, from a nonmagnetic two-phase stainless steel (for example, SUS329J1) having a mixed structure of austenite and ferrite. The signal pattern 23 is formed as an aggregate of a large number of spots 24 made of a material different in electromagnetic characteristics from the basic material by irradiation of the surface of the sheet 25 by a high energy beam such as a YAG laser or $CO_2$ laser.

In the signal pattern 23 illustrated in FIG. 2 and FIG. 3, the width is constant, but the spots 24 are not uniformly distributed in the direction of the length of the steering rack bar, but are denser at the right end side and sparser at the left end side. The density gradually and continuously changes in between so that the density of any one region is different from the density of other portions. The changes in the electromagnetic characteristics are created by irradiating the surface of the sheet 25 comprised of a two-phase stainless steel with a mixture of a nonmagnetic austenite and ferromagnetic ferrite by a converged high energy beam such as a laser for exactly a predetermined time so that portion is melted to a predetermined depth and so that simultaneous with the termination of the irradiation the heat is dispersed in the basic material and rapid cooling is effected, whereby a structure of just ferromagnetic ferrite or a structure with increased ferrite compared with before the irradiation is formed as a spot 24. A large number of spots 24 are formed on the surface of the basic material to form a predetermined distribution density, which is easily done by use of a technique such as NC control.

The signal pattern 23 may be formed by partially irradiating a high energy beam of a laser beam or electron beam on a sheet 25 comprised of a special material and also, of course, may be formed by heat treatment or other processing on part of the surface of the steering rack bar 8 itself.

Further, as another method for forming the signal pattern 23, it is possible to make the distribution of the spots 24 uniform and to instead gradually change the width or thickness (deepness) of the portion with changed electromagnetic characteristics in the longitudinal direction so as to form, for example, an elongated triangular shape etc. and therefore partially change the electromagnetic characteristics (magnetic permeability, conductivity, etc.) per unit area or unit volume. In this method, the signal pattern 23 does not have to be comprised of a group of spots 24 heat treated by a high energy beam. For example, when the steering rack bar 8 is made of a nonmagnetic stainless steel material, a sheet of a ferromagnetic material such as amorphous ribbon (METGLAS-2605SC) may be cut in the necessary signal pattern shape (elongated triangle etc.) and adhered to the surface of the steering rack bar 8 by a metal adhesive.

In the present invention, in short, it is sufficient to partially change the electromagnetic characteristics at a part of the steering rack bar 8 to thereby form a signal pattern 23 having different electromagnetic characteristics per unit area or unit volume for each position so as to show the position by the values of the characteristics. It is also possible to have a combination where the basic material is magnetic and the one indicating the signals is nonmagnetic.

The signal detector 16 for reading out the information of the signal pattern 23 and sensing the position may, for example, be a pickup coil, a magnetoresistance element, a Hall element, or other device which can detect the magnetic permeability, conductivity, and other electromagnetic characteristics per unit area or unit volume of the signal pattern 23. The value of the magnetic permeability or other characteristics read out by the signal detector 16 is input to the detection circuit, not shown, by the lead wire 17 and it is confirmed what position the portion of the signal pattern 23 which the signal detector 16 is facing is, whereby the absolute position of the steering rack bar 8 and therefore the steering angle are accurately sensed. This signal processing, as is frequently done, can be performed completely automatically by checking the detected characteristic value (for example, one converted to an output signal voltage) against a table of predetermined characteristic values and absolute positions in a data processing apparatus using a microprocessor.

In the steering angle sensor of the present invention, the signal pattern comprised of electromagnetic characteristics formed on the steering rack bar is read by a signal detector so as to detect in an analog fashion the analog position of the steering rack bar and immediately detect the steering angle. The steering rack bar is closest in the steering system to the wheels subjected to the steering operation and there is little fear of error in the later transmission mechanism, so there is the advantage that the detected steering angle becomes an extremely accurate value.

We claim:

1. A steering angle sensor for a vehicle, comprising:
   a steering gear box having a steering rack bar for changing the steering angle of wheels subjected to a steering operation in a vehicle,
   a signal pattern formed as a plurality of discrete spots on said steering rack bar and having detectable electromagnetic characteristics, said pattern extending along the length of said steering rack bar, wherein a longitudinal density of said spots changes progressively in a direction of measurement extending along the length of said pattern, and
   a signal detector, provided at a position opposing said steering rack bar for sensing said steering angle of the wheels subjected to a steering operation by said steering rack bar, reading said signal pattern and detecting the absolute position of said steering rack bar.

2. A steering angle sensor as set forth in claim 1, wherein said signal pattern is formed at a smooth back surface of said steering rack bar where no rack teeth are provided.

3. A steering angle sensor as set forth in claim 1, wherein said signal pattern is formed on a member formed integral with said steering rack bar and comprised of a material different from the basic material of said steering rack bar.

4. A steering angle sensor as set forth in claim 1, wherein said spots are comprised of a ferrite structure altered in electromagnetic characteristics through irradiation of a high energy beam on a surface of a nonmagnetic two-phase stainless steel having a mixed structure of austenite and ferrite.

5. A steering angle sensor as set forth in claim 4 wherein said high energy beam is a YAG laser.

6. A steering angle sensor as set forth in claim 4 wherein said high energy beam is a $CO_2$ laser.

7. A steering angle sensor as set forth in claim 1, wherein said pattern comprises a longitudinal spacing of said spots.

8. A steering angle sensor as set forth in claim 1, wherein said signal detector is comprised of one from the group consisting of a pickup coil, magnetoresistance element, and Hall element.

* * * * *